Nov. 1, 1938.  C. A. BRINSON  2,135,422
TREE CLAMP OR CUP PROTECTOR
Filed March 10, 1938
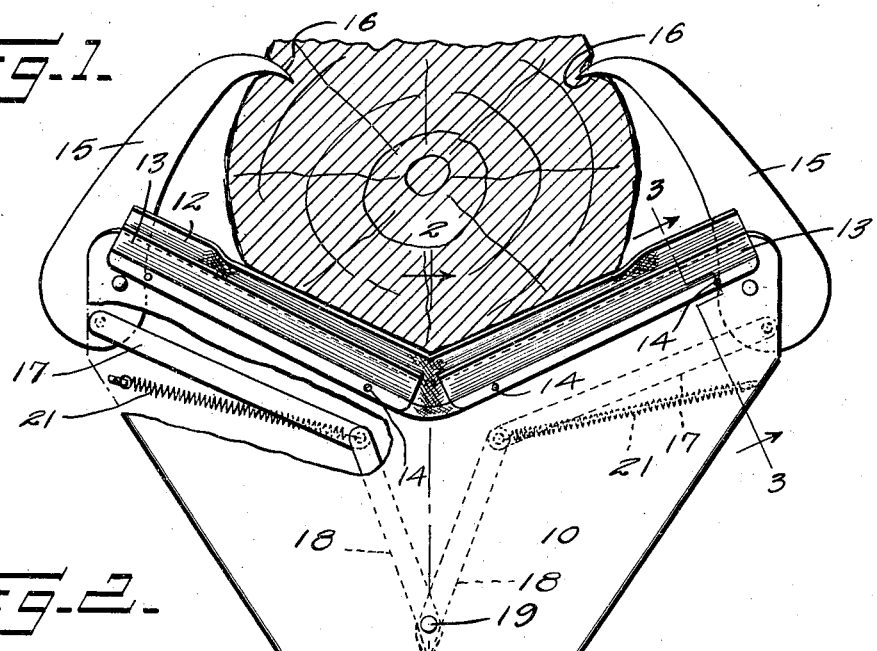
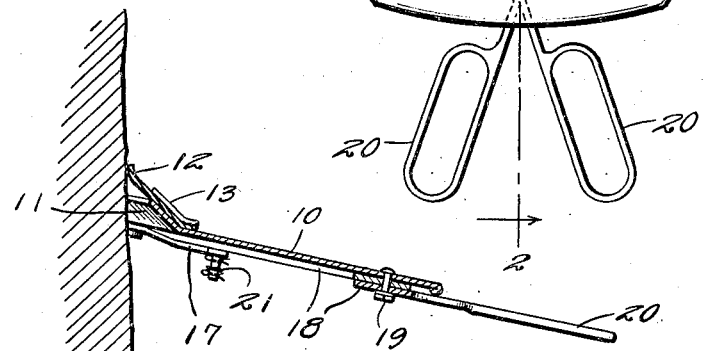
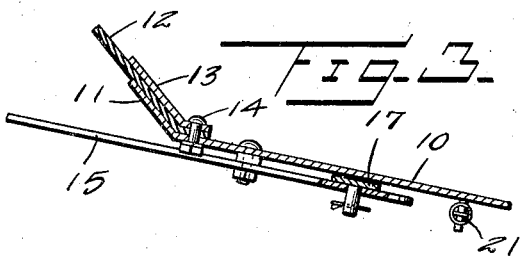
Inventor
C. A. Brinson
By Watson E. Coleman
Attorney Patented Nov. 1, 1938

2,135,422

UNITED STATES PATENT OFFICE 2,135,422

TREE CLAMP OR CUP PROTECTOR

Charles Aubrey Brinson, Palatka, Fla.

Application March 10, 1938, Serial No. 195,133

5 Claims. (Cl. 47—11)

This invention comprises a tree clamp or protector designed to overhang and protect a pitch, rosin, or turpentine collecting cup from chips or other refuse as for example, while cuttings are being made on the tree.

One of the objects of the invention is a device of this character which is light, easy to carry, and yet durable in construction and which can be readily attached to or removed from the tree with one hand, leaving the other hand of the operator entirely free.

A further object of the invention is an improved protecting device for turpentine collecting receptacles, the parts of which can be easily and cheaply made, readily assembled, and easily replaced when worn, and which will not be liable easily to get out of order.

With these and other objects in view, as will more fully appear as the description proceeds, reference is to be had to the accompanying drawing, in which Figure 1 is a plan view of my improved tree clamp or cup protector, a part of the base plate being broken away.

Fig. 2 is a vertical sectional view on the line 2—2 of Fig. 1.

Fig. 3 is a section on the line 3—3 of Fig. 1.

Referring to the drawing, the numeral 10 designates the base plate of my improved tree clamp or cup protector which may be of any shape and of any size so long as it is large enough to overhang or cover the collecting cup and gutters when attached to a tree, said base plate being preferably formed of metal or other stiff and non-collapsible material or substance, the inner edge of the base plate being recessed or of spread V formation, as best illustrated in Fig. 1, to substantially conform and partially encircle a tree trunk, the plate being formed at said inner edge with an upstanding flange 11 preferably disposed at about an angle of forty-five degrees to the main portion of the plate.

Attached to the upstanding and angularly disposed flange 11 of the base plate 10 is a relatively soft angular strip 12 preferably formed of soft rubber and attached to the flange 11 by means of clamping bars 13 secured in place by short bolts and nuts or other readily removable fastening devices 14 extending thru clamping strips 13 and the subjacent plate 10 at the base of the flange 11, thereby securely holding the conformable strip 12 in position, projecting inwardly and beyond the inner edges of the flange 11 and clamping strips 13 as best illustrated in Fig. 1, the detachable fastenings 14 making it easy to remove the strip 12 when worn so that it may be replaced by a new one. Manifestly this strip 12 is designed to follow the uneven surface of the tree whereby effectually to seal all openings and keep out all chips and refuse while the tree is being cut.

Carried by the base plate 10 and pivotally connected intermediate their ends to the lower face of the base plate are clamping arms 15 substantially in the form of prongs with sharp tree-engaging points 16, these arms being pivoted near their butt ends and the butt or rearward ends of the arms being pivotally connected by means of link bars 17 with the inner ends of crossed handle members 18 pivoted as at 19 to the lower face of the base plate 10, and projecting outwardly therefrom, the outer or free ends of said handle members being provided with handles 20 of any desired shape or formation, the same in the present instance being illustrated as elongated finger loops which may be readily grasped by one hand of the operator in attaching the structure to a tree trunk and in readily removing it therefrom.

21 designates contractile springs which are connected at one end in any desired manner to the lower face of the base plate 10, and which are connected at their adjacent or other ends to the links 17 and handle members 18 preferably at the jointed or pivotal connection of the links and handle members.

From the foregoing description in connection with the accompanying drawing, it will be readily apparent that in applying my improved tree clamp or collecting cup protector to a tree trunk above the collecting cup and the gutters or troughs leading thereto, all the operator has to do is to grasp the handles 20 with one hand and squeeze the handles together, this movement of the handle members thru the instrumentality of the link bars 17 drawing the butt ends of the clamping arms 15 towards each other and spreading apart the pointed ends of said arms whereby the device may be easily applied to the tree trunk and upon releasing the operator's grip upon the handle members, the contractile springs 21 will be permitted to act, moving the link bars 17 away from each other and swinging the pointed ends of the clamping arms into firm penetrating engagement with the trunk of the tree, the device in this position serving effectively to protect the underlying collecting cup and its troughs or gutters from chips or other refuse while the sap is running and particularly while cuttings are being made on the tree. It will thus be seen that I have provided a very simple, durable and efficient construction of tree clamp or cup protector composed of comparatively few parts that may be easily made and readily assembled and which are not liable to get out of order.

While the accompanying drawing illustrates what I believe to be the preferred embodiment of my invention it is to be understood that the invention is not limited thereto and that various changes may be made in the construction, arrangements and proportions of the different parts without departing from the scope of the invention as claimed.

What is claimed, is:

1. A device of the character described comprising a base plate, tree clamping arms pivotally connected to the base plate, handle members also pivotally connected to the base plate, and link connections between the handle members and the clamping arms.

2. A device of the character described, comprising a stiff non-collapsible base plate, tree clamping arms pivotally connected intermediate their ends to the base plate, handle members also pivotally connected to the base plate, and link bars pivotally connecting the handle members at one end to the butt ends of the clamping arms.

3. A device of the character described, comprising a base plate, tree clamping arms pivotally connected intermediate their ends to the base plate, crossed handle members also pivotally connected to the base plate and provided with finger grasping members projecting beyond the base plate, link bars pivotally connecting the inner ends of the crossed handle members to the butt ends of the tree clamping arms, and contractile springs connected to the base plate and to the handle members and link bars and tending to move the same in a direction to effect the movement of the inner ends of the tree clamping members towards each other.

4. A device of the character described, comprising a base plate designed at one edge to partially encircle a tree trunk and formed at such edge with an upstanding flange, a conformable binding strip applied to said flange and projecting therebeyond, clamping bars connecting said conformable strip to the flange of the base plate, tree clamping arms connected to the base plate, and handle members also connected to the base plate and operatively connected to the tree clamping arms.

5. A device of the character described comprising a base plate formed at one edge to partially encircle a tree trunk and provided at such edge with an upstanding angularly disposed flange, a conformable strip applied to said flange, clamping bars applied to said strip and clamping the strip between them and said flange, detachable fastening devices connecting the clamping bars and the flange with the intervening strip between them whereby the strip may be detached and a new one substituted for it, tree clamping arms pivotally connected to the base plate, handle members also pivotally connected to the base plate, link bars connecting the inner ends of the handle members to the butt ends of the tree clamping arms, and contractile springs connected to the base plate and to the handle members and link bars.

CHARLES AUBREY BRINSON.